United States Patent
Nagaraja et al.

(10) Patent No.: US 10,791,579 B2
(45) Date of Patent: Sep. 29, 2020

(54) RANDOM ACCESS RESPONSE (RAR) MONITORING FOR MULTIPLE PREAMBLE TRANSMISSIONS IN MULTI-BEAM OPERATION

(71) Applicant: QUALCOMM Incorporated, San Diego, CA (US)

(72) Inventors: Sumeeth Nagaraja, San Diego, CA (US); Tao Luo, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/240,162

(22) Filed: Jan. 4, 2019

(65) Prior Publication Data
US 2019/0223222 A1 Jul. 18, 2019

Related U.S. Application Data

(60) Provisional application No. 62/617,094, filed on Jan. 12, 2018.

(51) Int. Cl.
| | |
|---|---|
| *H04W 4/00* | (2018.01) |
| *H04W 74/08* | (2009.01) |
| *H04B 7/06* | (2006.01) |
| *H04B 7/0408* | (2017.01) |
| *H04L 1/18* | (2006.01) |
| *H04L 27/26* | (2006.01) |

(Continued)

(52) U.S. Cl.
CPC ...... *H04W 74/0833* (2013.01); *H04B 7/0408* (2013.01); *H04B 7/0695* (2013.01); *H04L 1/1861* (2013.01); *H04L 27/2692* (2013.01); *H04W 36/30* (2013.01); *H04L 5/0094* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2015/0282215 A1* | 10/2015 | Eriksson | H04W 74/0833 370/329 |
| 2016/0198497 A1* | 7/2016 | Yu | H04W 74/0833 370/330 |

(Continued)

OTHER PUBLICATIONS

International Search Report and Written Opinion—PCT/US2019/012500—ISA/EPO—dated Mar. 19, 2019.

(Continued)

*Primary Examiner* — Siren Wei
(74) *Attorney, Agent, or Firm* — Haynes and Boone, LLP

(57) ABSTRACT

Wireless communications systems and methods related to performing a random access procedure are provided. A first wireless communication device receives a random access response monitoring configuration for a plurality of random access opportunities associated with a random access attempt. The first wireless communication device transmits, to a second wireless communication device, one or more random access preambles associated with the plurality of random access opportunities. The first wireless communication device monitors for a random access response for each of the one or more random access preambles based on the random access response monitoring configuration.

33 Claims, 10 Drawing Sheets

(51) Int. Cl.
*H04W 36/30* (2009.01)
*H04L 5/00* (2006.01)

(56) References Cited

U.S. PATENT DOCUMENTS

| | | | |
|---|---|---|---|
| 2017/0332406 A1 | 11/2017 | Islam et al. | |
| 2018/0077732 A1* | 3/2018 | Yi | H04W 74/0833 |
| 2018/0220466 A1* | 8/2018 | Park | H04W 74/0833 |
| 2018/0368189 A1* | 12/2018 | Narasimha | H04W 56/001 |

OTHER PUBLICATIONS

QUALCOMM Incorporated: "Measurement Reporting and Beam Refinement during RACH," 3GPP Draft; R2-1706912 Beam Refinement After RACH, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017, XP051301409, 8 pages, Retrieved from the Internet: URL: http://www.3gpp.org/ftp/Meetings_3GPP_SYNC/RAN2/Docs/ [retrieved on Jun. 26, 2017].

QUALCOMM Incorporated: "4-step RACH Procedure Consideration", 3GPP DRAFT; R1-1713382 4-step RACH Procedure Consideration, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; May 15, 2017—May 19, 2017 Aug. 20, 2017, XP051316187, Retrieved from the Internet: URL: http://www.3gpp.org/ftp/Meetings_3GPP_SYNC/RAN1/Docs/ [retrieved on Aug. 20, 2017], 13 pages.

\* cited by examiner

RANDOM ACCESS RESPONSE (RAR) MONITORING FOR MULTIPLE PREAMBLE TRANSMISSIONS IN MULTI-BEAM OPERATION

CROSS REFERENCE TO RELATED APPLICATIONS

The present application claims priority to and the benefit of the U.S. Provisional Patent Application No. 62/617,094, filed Jan. 12, 2018, which is hereby incorporated by reference in its entirety as if fully set forth below and for all applicable purposes.

TECHNICAL FIELD

This application relates to wireless communication systems, and more particularly to random access response (RAR) monitoring for multiple preamble transmissions in multi-beam operation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. One technique for expanding connectivity may be to extend the frequency operation range to higher frequencies since lower frequencies are becoming over-crowded. For example, millimeter wave (mmWave) frequency bands between about 30 gigahertz (GHz) to about 300 GHz can provide a large bandwidth for high data rate communications. However, the mmWave frequency bands may have a higher path loss compared to the lower frequency bands used by conventional wireless communication systems.

To overcome the higher path loss, BSs and UEs may use directional beams for communications. For example, when a UE attempts to connect to a BS, the UE may transmit multiple random access preambles in multiple beam directions. Upon detecting a random access preamble, the BS may respond by transmitting a random access response in the same beam direction as the detected random access preamble. As such, the UE may perform random access response monitoring in multiple beam directions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device, a random access response monitoring configuration for a plurality of random access opportunities associated with a random access attempt; transmitting, by the first wireless communication device to a second wireless communication device, one or more random access preambles associated with the plurality of random access opportunities; and monitoring, by the first wireless communication device, for a random access response for each of the one or more random access preambles based on the random access response monitoring configuration.

In an additional aspect of the disclosure, a method of wireless communication includes identifying, by a first wireless communication device, a random access response monitoring configuration for a plurality of random access opportunities associated with a random access attempt; receiving, by the first wireless communication device from a second wireless communication devices, one or more random access preambles associated with the plurality of random access opportunities; and transmitting, by the first wireless communication device to the second wireless communication device, one or more random access responses in response to the one or more random access preambles based on the random access response monitoring configuration.

In an additional aspect of the disclosure, an apparatus includes a transceiver configured to receive a random access response monitoring configuration for a plurality of random access opportunities associated with a random access attempt; and transmit, to a second wireless communication device, one or more random access preambles associated with the plurality of random access opportunities; and a processor configured to monitor for a random access response for each of the one or more random access preambles based on the random access response monitoring configuration.

In an additional aspect of the disclosure, an apparatus includes a processor configured to identify a random access response monitoring configuration for a plurality of random access opportunities associated with a random access attempt; and a transceiver configured to receive, from a second wireless communication devices, one or more random access preambles associated with the plurality of random access opportunities; and transmit, to the second wireless communication device, one or more random access responses in response to the one or more random access preambles based on the random access response monitoring configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that

DETAILED DESCRIPTION

Figure 1:
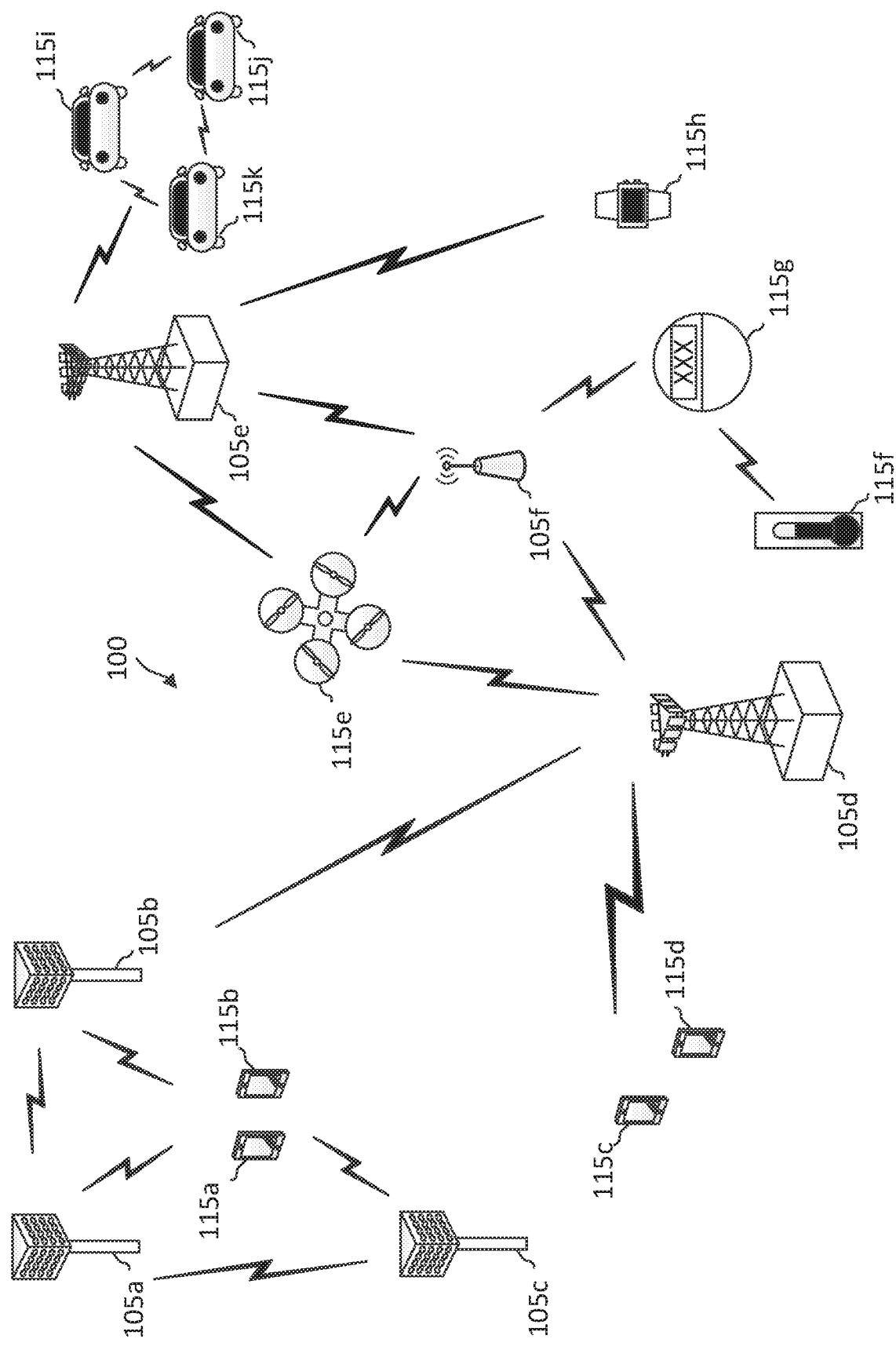
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for monitoring random access responses for multiple random access opportunities with random access preambles transmitted in multiple beam directions. In the disclose embodiments, a BS and a UE may be configured with the same random access response configuration. The random access response configuration may indicate a monitoring time period within a random access response window for each random access opportunity. For example, a UE may transmit multiple random access preambles, each in a different beam direction, over multiple random access opportunities associated with a random access attempt. The UE may monitor for a random access response associated with a random access opportunity in a corresponding monitoring time period based on the configuration. The BS may transmit a random access response associated with a random access opportunity in a corresponding monitoring time period based on the configuration.

In an embodiment, the BS may transmit a random access response for a detected random access preamble in the same beam direction as the detected random access preamble. Similarly, the UE may monitor for a random access response for a transmitted random access preamble over the same beam direction as the transmitted random access preamble. The use of the random access response configuration allows the UE to align reception beam directions to the BS's transmission beam directions during the random access response window.

In an embodiment, the UE may receive the random access response configuration from the BS or another BS. For example, the UE may receive the random access response configuration in a handover command issued by a serving BS or a source BS and the random access may be performed against a target BS for the handover.

In some other embodiments, the UE may not receive a random access response configuration. In such embodiments, the UE may perform random access response monitoring based on beam qualities, for example, determined based on synchronization signals and/or reference signals received from the BS or a target BS during a handover.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes 01-DM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform a random access procedure to establish a connection with the BS 105. After establishing a connection, the UE 115 and the BS 105 can enter a normal operation stage, where operational data may be exchanged.

The random access procedure performed during the initial network access is contention-based, where multiple UEs 115 may contend for the same random access resource to gain access to the network 100. In some embodiments, the UE 115 may perform a contention-free random access procedure, for example, during a handover. In such embodiments, the BS 105 serving the UE 115 may issue a handover command to the UE 115. The handover command may indicate dedicated contention-free random access resources and/or various configurations for the UE 115 to perform a contention-free random access procedure with a target BS 105. After completing the contention-free random access procedure, the UE 115 may exchange operational data with the target BS 105.

In some embodiments, a UE 115 may be allowed to transmit multiple random access preambles using multiple random access opportunities for a random access attempt. In addition, the UE 115 may transmit the multiple random access preambles in multiple beam directions and a BS 105 may respond by transmitting multiple random access responses in multiple beam directions. Mechanisms for performing random access procedures using multiple random access opportunities with multiple beam directions are described in greater detail herein.

Figure 2:
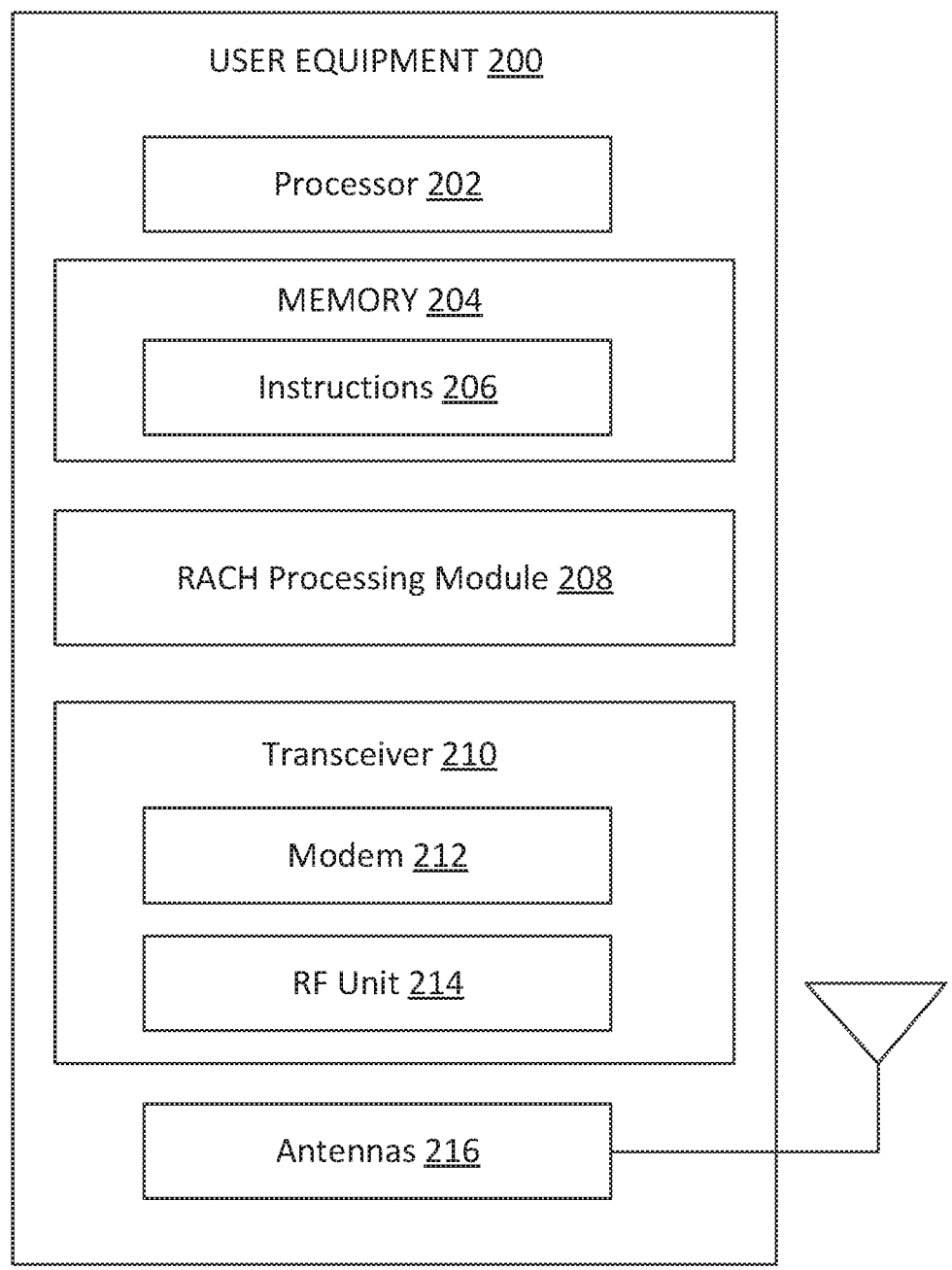
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a RACH processing module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The RACH processing module 208 may be implemented via hardware, software, or combinations thereof. For example, the RACH processing module 208 may be implemented as a processor, circuit, and/or instructions 206 stored in the memory 204 and executed by the processor 202. The RACH processing module 208 may be used for various aspects of the present disclosure. For example, the RACH processing module 208 is configured to receive a random access preamble transmission configuration (e.g., including transmission resources for multiple random access opportunities), a random access response monitoring configuration (e.g., including a sequence of time periods for multiple random access opportunities with a random access response window), and/or a handover command from a BS (e.g., the BS 105), monitor beam qualities, determine transmission beam directions based on the beam qualities, transmit random access preambles to the BS using resources indicated in the received random access preamble transmission configuration and the determined beam directions, and/or monitor for random access responses from the BS according to the received random access response monitoring configuration, beam directions used for the random access preamble transmissions, and/or a link quality parameter, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the PDCCH monitoring and processing module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
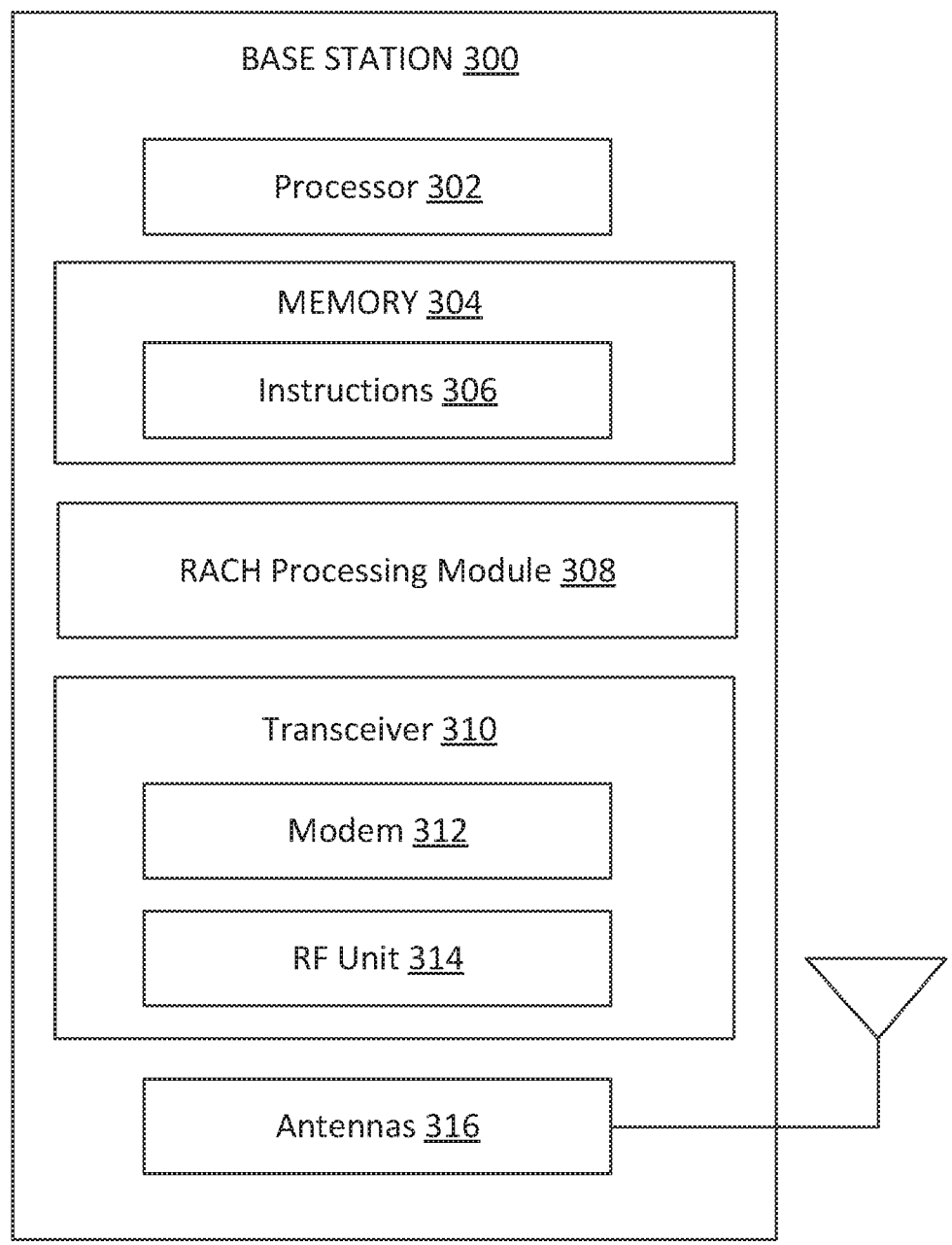
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, a RACH processing module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The RACH processing module 308 may be implemented via hardware, software, or combinations thereof. For example, the RACH processing module 308 may be implemented as a processor, circuit, and/or instructions 306 stored in the memory 304 and executed by the processor 302. The RACH processing module 308 may be used for various aspects of the present disclosure. For example, the RACH processing module 308 is configured to transmit a random access preamble transmission configuration (e.g., including transmission resources for multiple random access opportunities), a random access response monitoring configuration (e.g., including a sequence of time periods for multiple random access opportunities with a random access response window), and/or a handover command to a UE (e.g., the UEs 115 and 200), monitor for a transmit random access preamble from the UE based on the random access preamble transmission configuration, and/or transmit random access responses in response to random access preambles received from the UE based on the random access response monitoring configuration and beam directions of the received random access preambles, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of PDCCH signals according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
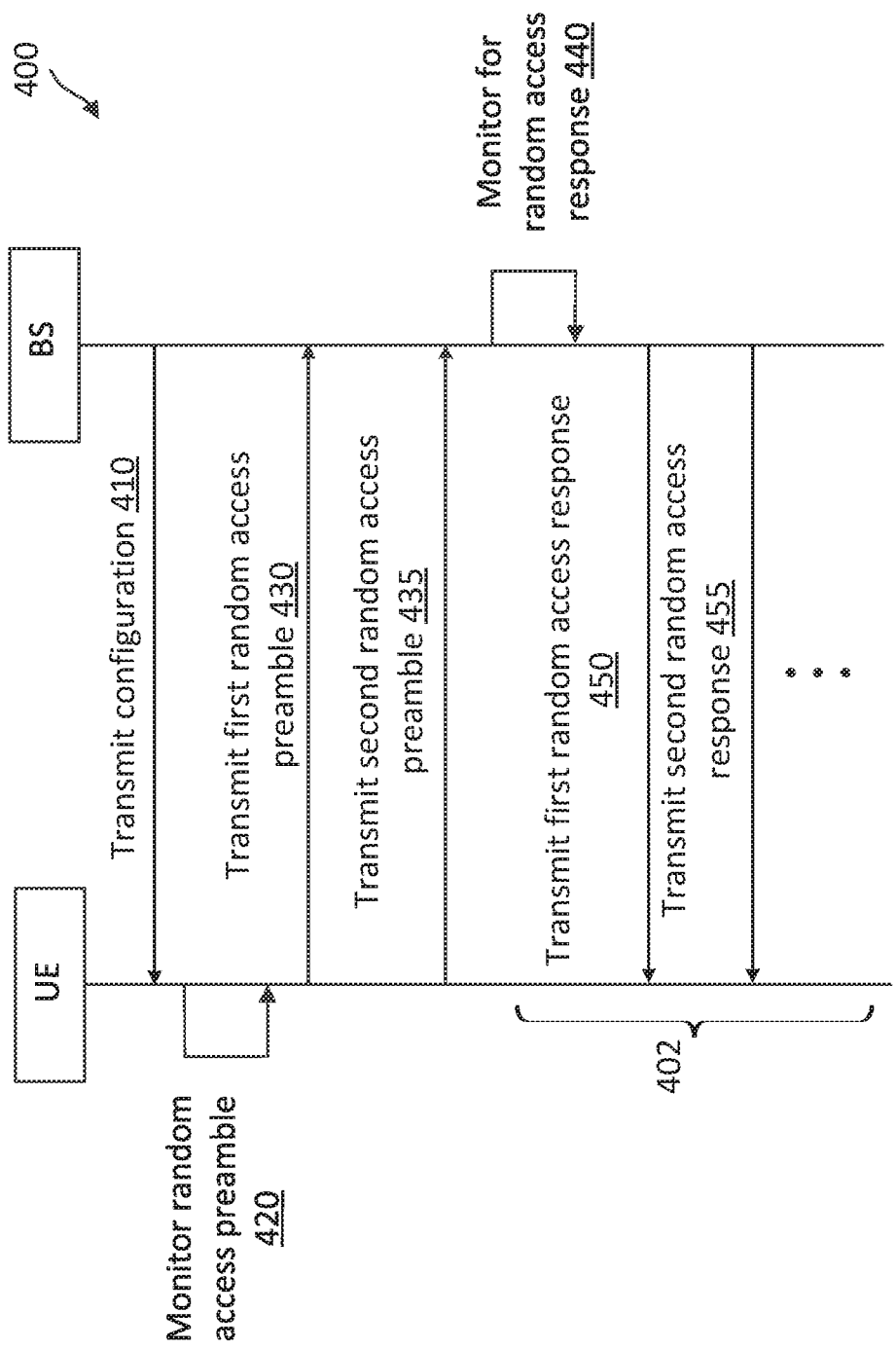
FIG. 4 is a signaling diagram of a random access method according to some embodiments of the present disclosure.

FIG. 4 is a signaling diagram of a random access method 400 according to some embodiments of the present disclosure. The method 400 is implemented by a BS (e.g., the BSs 105 and 300) and a UE (e.g., the UEs 115 and 200) in a network (e.g., the network 100). Steps of the method 400 can be executed by computing devices (e.g., a processor, processing circuit, and/or other suitable component) of the BS and the UE. As illustrated, the method 400 includes a number of enumerated steps, but embodiments of the method 400 may include additional steps before, after, and in between the enumerated steps. In some embodiments, one or more of the enumerated steps may be omitted or performed in a different order.

At step 410, a BS transmits a configuration, for example, via an RRC message. The configuration may indicate a plurality of random access opportunities including transmission resources (e.g., time-frequency resources and/or random access preamble indices), a plurality of random access response monitoring periods corresponding to the plurality of random access opportunities. In some embodiments, the random access response monitoring periods may be indicated in the form of a bit-pattern, as described in greater detail herein.

At step 420, the BS monitors for a random access preamble from a UE based on the configuration (e.g., the configured random access preamble transmission resources).

At step 430, the UE transmits a first random access preamble based on the configuration, for example, using a transmission resource configured for a first random access opportunity. The UE may transmit the first random access preamble in a first beam direction.

At step 440, the UE transmits a second random access preamble based on the configuration, for example, using a transmission resource configured for a second random access opportunity. The UE may transmit the second random access preamble in a second beam direction different from the first beam direction.

At step 450, the UE monitors for a random access response from the BS during a random access response window 402. The monitoring may be based on the configured random access response monitoring periods. The random access response window 402 may begin after a period 404 from the end of the first random access preamble transmission, as described in greater detail herein.

For example, the UE may monitor for a first random access response for the first random access preamble during a first random access response monitoring period associated with the first random access opportunity. The UE may monitor for a second random access response for the second random access preamble during a second random access response monitoring period associated with the second random access opportunity.

The UE may form reception beams based on the first beam direction and the second beam direction for the monitoring. For example, the UE may form a reception beam based on the first beam direction for the monitoring in the first monitoring period and may form another reception beam based on the second beam direction for the monitoring in the second monitoring period.

At step 460, upon receiving the first random access preamble, the BS transmits a first random access response in a first random access response monitoring period associated with the first random access opportunity. The BS may transmit the first random access response in the same beam direction (e.g., the first beam direction) as where the first random access preamble is received.

At step 470, upon receiving the second random access preamble, the BS transmits a second random access response in a second random access response monitoring period associated with the second random access opportunity. The BS may transmit the second random access response in the same beam direction (e.g., the second beam direction) as where the second random access preamble is received. In some embodiments, the first and second random access preambles may be referred to as MSG1 and the first and second random access responses may be referred to as MSG2.

In an embodiment, the UE may select the first beam direction and the second beam direction based on monitoring of SSBs and/or CSI-RSs received from the BS. For example, the BS may transmit SSBs and/or CSI-RSs in multiple beam directions and the UE may determine that the beam direction and the second beam direction provide the best beam quality among the multiple beam directions based on the monitoring.

In an embodiment, the configuration may indicate a first set of random access preamble transmission resources for a beam failure associated with an SSB reception and a second set of random access preamble transmission resources for a beam failure associated with a CSI-RS reception. In such an embodiment, when the random access is triggered by a beam failure associated with an SSB reception, the UE may use the first set of resources for random access preamble transmissions. Alternatively, when the random access is triggered by a beam failure associated with a CSI-RS reception, the UE may use the second set of resources for random access preamble transmissions.

In an embodiment, the random access may be contention-based. Thus, the random access preamble transmission resources may be contention-based resources. In such an embodiment, the UE may further transmit a connection request (e.g., MSG3) and the BS may respond by transmitting a connection response (e.g., MSG4) to complete the random access procedure.

In an embodiment, the random access may be contention-free. Thus, the random access preamble transmission resources may be dedicated resources. In such an embodiment, the random access is completed after a successful reception of a random access response at the UE.

In an embodiment, the random access may be associated with a handover. In such an embodiment, the UE may receive the configuration from a source BS or a serving BS and perform the random access procedure with a target BS. For example, the source BS may transmit a handover command to the UE including the configuration and a target BS.

Figure 5:
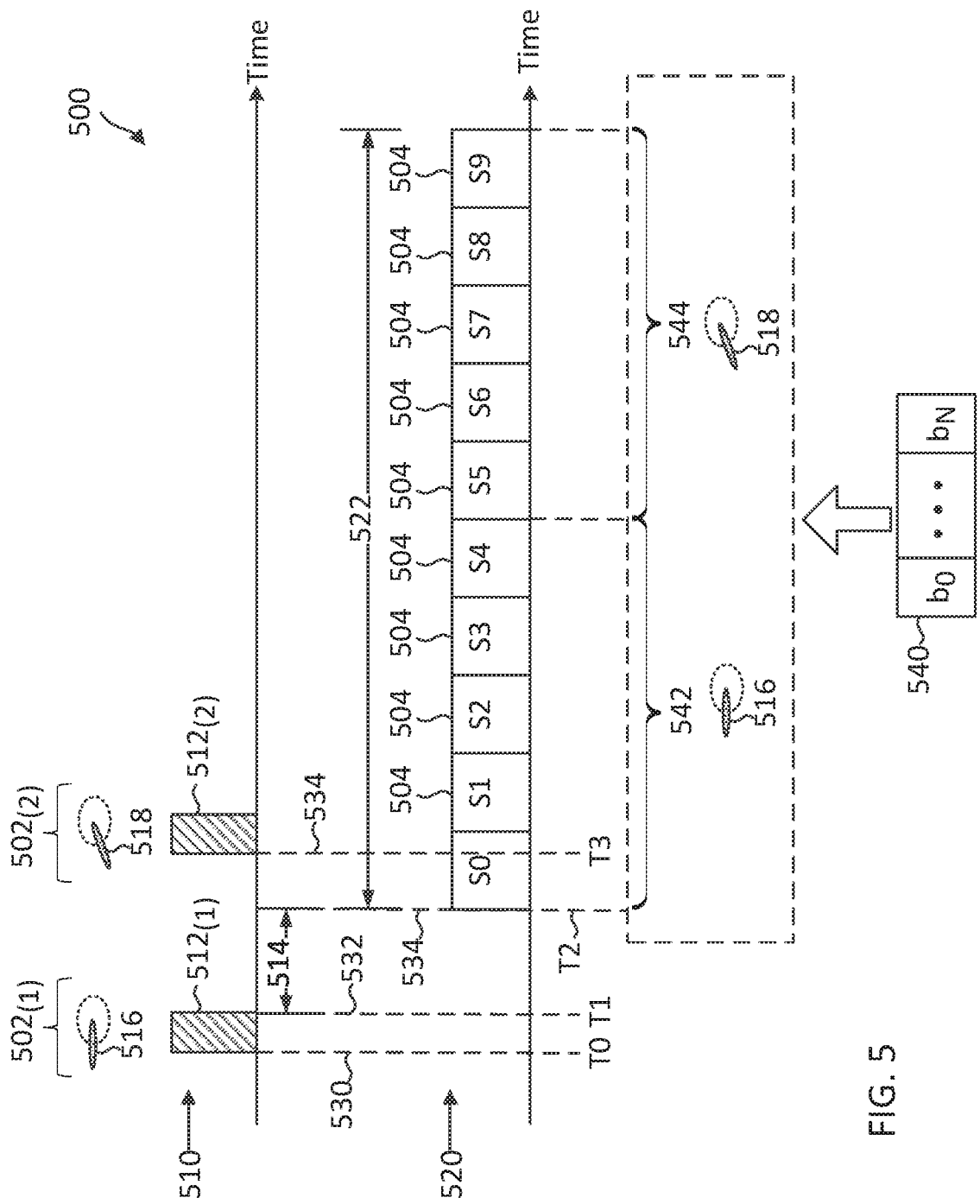
FIG. 5 illustrates a random access response monitoring method according to some embodiments of the present disclosure.
Figure 6:
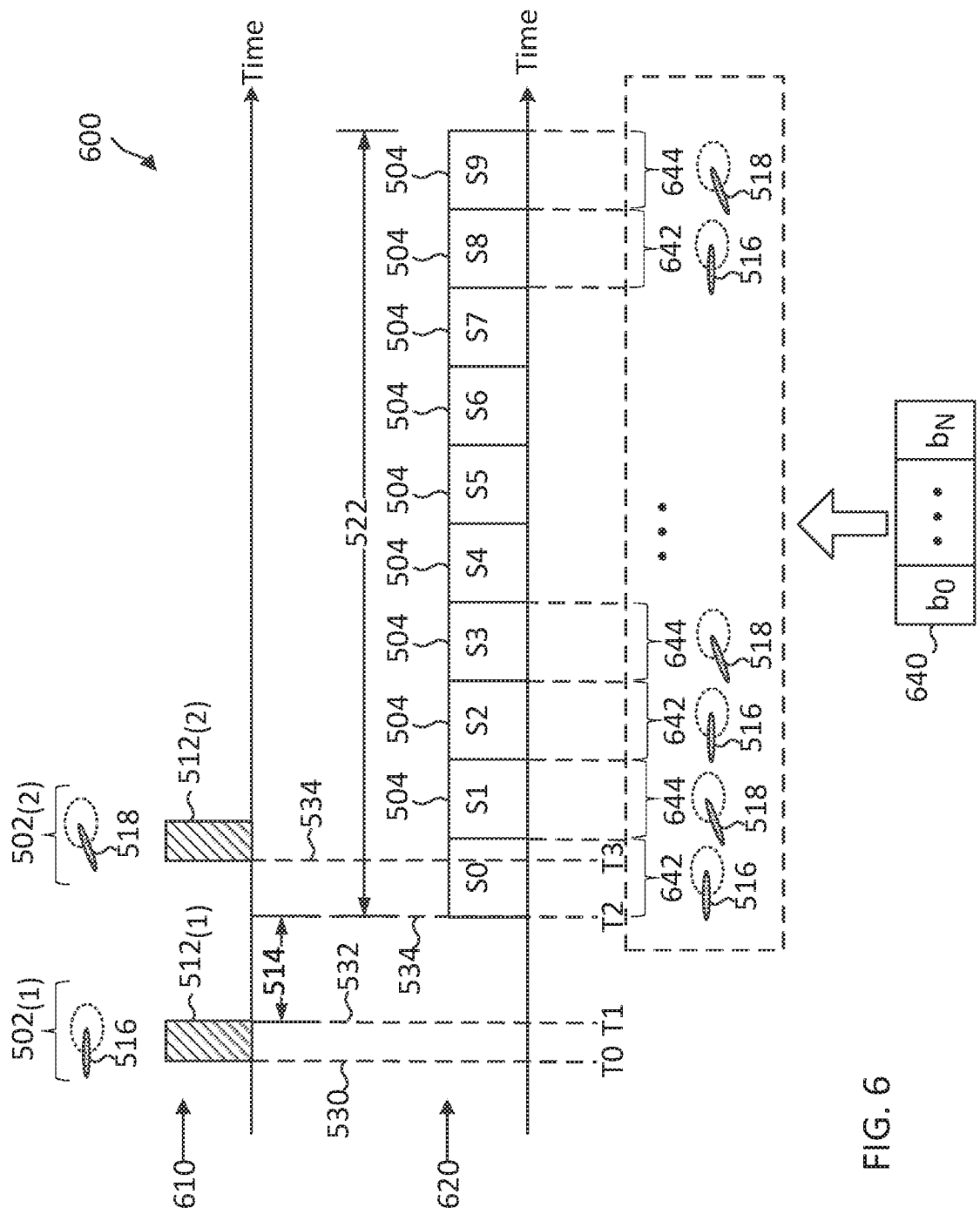
FIG. 6 illustrates a random access response monitoring method according to some embodiments of the present disclosure.

FIGS. 5-6 illustrates various mechanisms for a UE (e.g., the UEs 115 and 200) to monitor for random access responses based on a bit-pattern provided by a BS (e.g., the BSs 105 and 300). In FIGS. 5-6, the x-axes represent time in some constant units.

FIG. 5 illustrates a random access response monitoring scheme 500 according to some embodiments of the present disclosure. The scheme 500 may be employed by the UEs 115 and 200 and the BSs 105 and 300. The scheme 500 illustrates an example multi-beam random access response monitoring that may be used by the method 400. FIG. 5 illustrates two random access opportunities 502 associated with a random access attempt for simplicity of discussions, though it will be recognized that embodiments of the present disclosure may scale to include any suitable number of random access opportunities (e.g., about 3, 4, 5 or more) for a random access attempt.

The scheme 500 includes a random access preamble transmission timeline 510 and a corresponding random access response monitoring timeline 520. As an example, a random access attempt may include a first random access opportunity $502_{(1)}$ beginning at time 530, denoted as T0, and a second random access opportunity $502_{(2)}$ beginning at time 534, denoted as T3. In some embodiments, the random access opportunities 502 may be referred to as random access occasions. As shown in the timeline 510, a UE transmits a first random access preamble $512_{(1)}$ and a second random access preamble $512_{(2)}$ to a BS in in the first random access opportunity $502_{(1)}$ and the second random access opportunity $502_{(2)}$, respectively. The random access preambles 512 may include a predetermined sequence, for example, a Zadoff-Chu sequence. The first random access preamble $512_{(1)}$ is transmitted in a first beam direction 516. The second random access preamble $512_{(2)}$ is transmitted in a second, different beam direction 518.

The UE may monitor for a random access response for the each of the transmitted random access preambles 512 in a random access response window 522 (e.g., the random access response window 402). The random access response window 522 may begin after a time period 514 from the end of the first preamble transmission (e.g., at time 532, denoted as T1). The time period 514 may include a duration of X symbols, where X may be any suitable positive integer (e.g., between about 14 to 56).

As shown in the timeline 520, the random access response window 522 begins at time 534, denoted as T2. The random access response window 522 may include ten slots 504 indexed S0 to S9 as shown or any suitable number of slots 504. Each slot 504 may include about 7 OFDM symbols, about 14 OFDM symbols, or any suitable number of symbols (e.g., about 1 or 2 as in a mini-slot).

The UE may perform random access response monitoring based on a random access response monitoring configuration 540 provided by the BS. The configuration 540 may include a bit-pattern (e.g., shown as $b_0$ to $b_N$, where N may be any positive integer) indicating a mapping between the slots 504 in the random access response window 522 and the random access opportunities 502. As an example, the configuration 540 may indicate that a random access response corresponding to the first random access opportunity $502_{(1)}$ may be transmitted in a portion 542 of the random access response window 522 and a random access response corresponding to the second random access opportunity $502_{(2)}$ may be transmitted in another portion 544 of the random access response window 522. The portion 542 may include the first five slots 504 indexed from S0 to S4 in the random access response window 522. The portion 544 may include the next five slots 504 indexed from S5 to S9 in the random access response window 522.

Thus, the UE may configure a reception beam in the first beam direction 516 (e.g., corresponding to the preamble transmission in the first random access opportunity $502_{(1)}$) for monitoring in the portion 542 and may configure a reception beam in the second beam direction 518 (e.g., corresponding to the preamble transmission in the first random access opportunity $502_{(2)}$) for monitoring in the portion 544.

The BS may respond to random access preambles by transmitting random access responses based on the configuration 540. For example, when the BS detects the random access preamble $512_{(1)}$ from the first beam direction 516, the BS may respond by transmitting a random access response during the portion 542 in the same first beam direction 516. Similarly, when the BS detects the random access preamble $512_{(2)}$ from the second beam direction 518, the BS may respond by transmitting a random access response during the portion 544 in the same second beam direction 518.

In some embodiments, the BS may use a wider beam including the first beam direction 516 when responding to the first random access preamble $512_{(1)}$ and may use a wider beam including the second beam direction 518 when responding to the first random access preamble $512_{(1)}$. Similarly, the UE may use a wide beam including the first beam direction 516 for the monitoring in the portion 542 and may use a wide beam including the second beam direction 518 for the monitoring in the portion 544. As can be seen, the configuration 540 enables the UE to align random access response monitoring to the BS's random access response transmissions.

FIG. 6 illustrates a random access response monitoring scheme 600 according to some embodiments of the present disclosure. The scheme 600 may be employed by the UEs 115 and 200 and the BSs 105 and 300. The scheme 600 illustrates an example multi-beam random access response monitoring that may be used by the method 400. The scheme 600 is substantially similar to the scheme 500, but employs a different random access response monitoring configuration 640. Similar to the configuration 540, the configuration 640 may be in the form of a bitmap. However, the configuration 640 may alternates the random access response transmissions and/or monitoring between the two random access opportunities 502.

As shown, the configuration 640 indicates that a random access response corresponding to the first random access opportunity $502_{(1)}$ may be in portions 642 of the random access response window 522 and a random access response corresponding to the second random access opportunity $502_{(2)}$ may be in portions 644 of the random access response window 522. The portions 642 and portions 644 may include alternating slots 504.

The BS may respond to the first random access preamble $512_{(1)}$ by transmitting a random access response during a portion 642 in the first beam direction 516. The BS may respond to the second random access preamble $512_{(2)}$ by transmitting a random access response during a portion 642 in the second beam direction 518. The UE may monitor for a random access response for the first random access preamble $512_{(1)}$ over the first beam direction 516 during the portions 642. The UE may monitor for a random access response for the second random access preamble $512_{(2)}$ over the second beam direction 518 during the portions 644.

Figure 7:
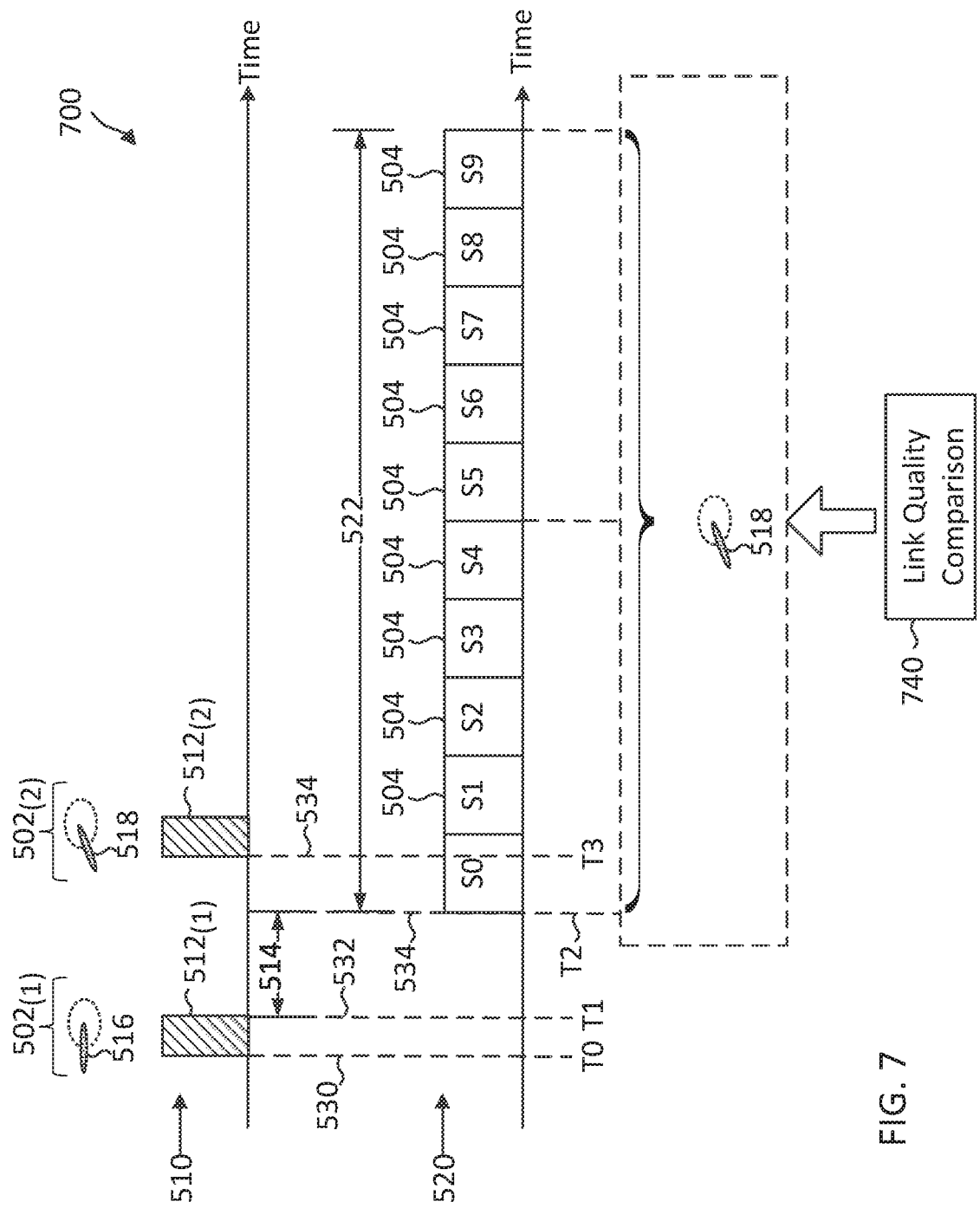
FIG. 7 illustrates a random access response monitoring method according to some embodiments of the present disclosure.
Figure 8:
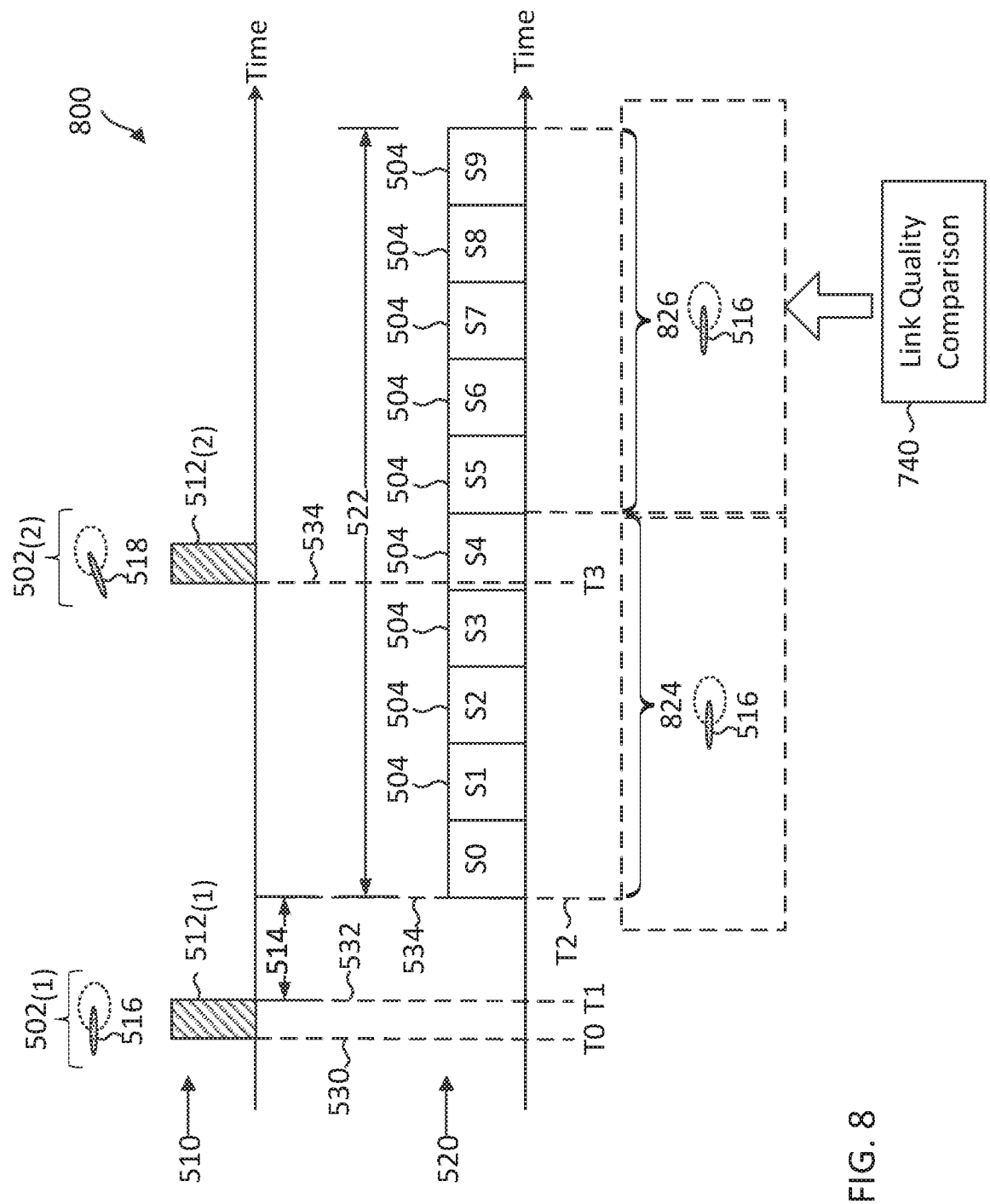
FIG. 8 illustrates a random access response monitoring method according to some embodiments of the present disclosure.

FIGS. 7-8 illustrates various mechanisms for a UE (e.g., the UEs 115 and 200) to monitor for random access responses without a given random access response monitoring configuration (e.g., the configurations 540 and 640).

FIG. 7 illustrates a random access response monitoring scheme 700 according to some embodiments of the present disclosure. The scheme 700 may be employed by the UEs 115 and 200 and the BSs 105 and 300. The scheme 700 is illustrated using the same random access opportunity configuration as the schemes 500 and 600. In the scheme 700, the UE may perform random access response monitoring based on a beam quality or link quality comparison 740. As an example, the UE may determine that the first beam direction 516 has a higher quality than the second beam direction 518, for example, based on received signal powers or signal-to-interference-plus-noise ratios (SINRs). Thus, the UE may monitor for a random access response from the BS using the first beam direction 516 over the random access response window 522.

FIG. 8 illustrates a random access response monitoring scheme 800 according to some embodiments of the present disclosure. The scheme 800 may be employed by the UEs 115 and 200 and the BSs 105 and 300. The scheme 800 is illustrated using a substantially similar random access opportunity configuration as in the schemes 500, 600, and 700. However, the second random access opportunity $502_{(2)}$ occurs at a later time 536, denoted as T4, in the random access response window 522. In the scheme 800, the UE may monitor for a random access response over the first beam direction 516 during a portion 824 of the random access response window 822 before transmitting the second random access preamble $512_{(2)}$ in the second random access opportunity $502_{(2)}$. After transmitting the second random access preamble $512_{(2)}$, the UE may determine a beam direction for the monitoring based on a link quality comparison 840. As an example, the UE may determine that the first beam direction 516 has a higher quality than the second beam direction 518. Thus, the UE may continue to monitor for a random access response from the BS using the first beam direction 516 during a subsequent portion 826 of the random access response window 522.

In some embodiments, when the first beam direction 516 and the second beam direction 518 are sufficiently close, the UE may configure a wide reception beam including the first beam direction 516 and the second beam direction 518 for the monitoring.

Figure 9:
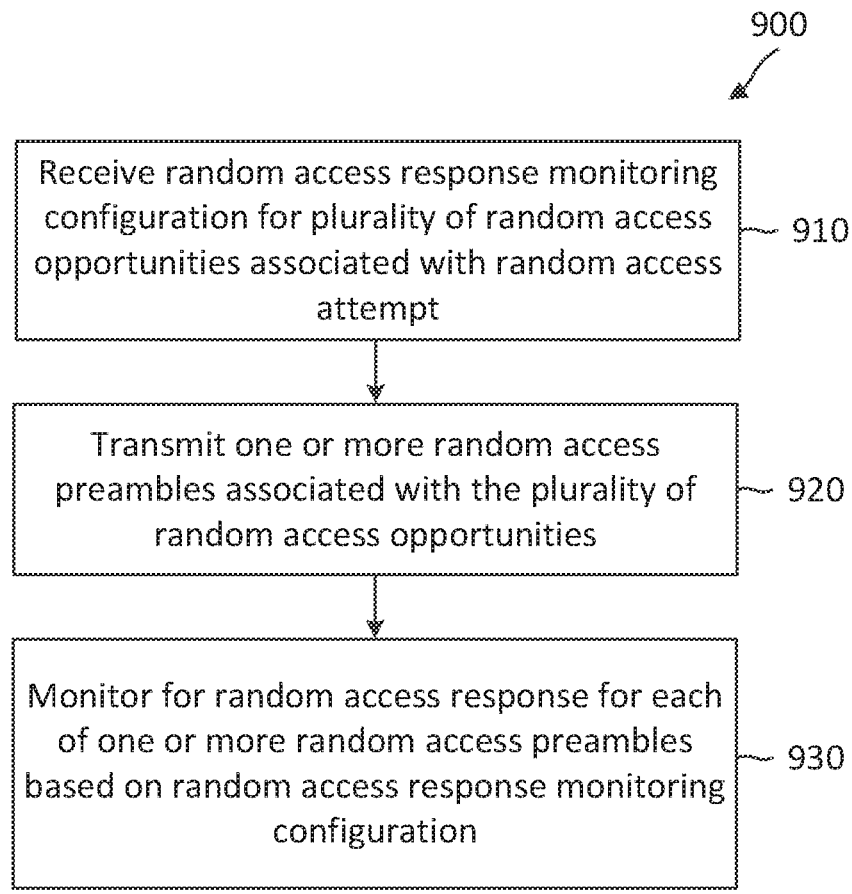
FIG. 9 is a flow diagram of a random access method according to embodiments of the present disclosure.

FIG. 9 is a flow diagram of a random access method 900 according to embodiments of the present disclosure. Steps of the method 900 can be executed by a computing device (e.g., a processor, processing circuit, and/or other suitable component) of a wireless communication device, such as the UEs 115 and 200. The method 900 may employ similar mechanisms as in the method 400 and the schemes 500, 600, 700, and/or 800 described with respect to FIGS. 4, 5, 6, 7, and/or 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by a first wireless communication device, a random access response monitoring configuration (e.g., the configurations 540 and 640) for a plurality of random access opportunities (e.g., the random access opportunities 502) associated with a random access attempt.

In an embodiment, the random access response monitoring configuration may include a sequence of time region or time periods (e.g., the portions 542, 544, 642, and 644)

within a random access response window (e.g., the random access response window 522) for the plurality of random access opportunities. For example, the random access response monitoring configuration may indicate a first monitoring time period (e.g., the portion 542 or 642) for a first random access opportunity (e.g., the random access opportunity $502_{(1)}$) and a second monitoring time period (e.g., the portion 542 or 642) for a second random access opportunity (e.g., the random access opportunity $502_{(2)}$).

At step 920, the method 900 includes transmitting, by the first wireless communication device to a second wireless communication device, one or more random access preambles (e.g., the random access preambles 512) associated with the plurality of random access opportunities.

For example, the first wireless communication device may transmit a first random access preamble (e.g., the random access preambles $512_{(1)}$) in a first beam direction (e.g., the beam direction 516) over a first random access opportunity (e.g., the random access opportunity $502_{(1)}$) and may transmit a second random access preamble (e.g., the random access preambles $512_{(2)}$) in a second beam direction (e.g., the beam direction 518) over a second random access opportunity (e.g., the random access opportunity $502_{(2)}$). The first and second beam directions are different.

At step 930, the method 900 includes monitoring, by the first wireless communication device, for a random access response for each of the one or more random access preambles based on the random access response monitoring configuration.

For example, the first wireless communication device may monitor for a random access response for the first random access preamble during the first monitoring time period and monitor for a random access response for the second random access preamble during the second monitoring time period. In an embodiment, the first wireless communication device may monitor for a random access response in the same beam direction as a corresponding transmitted random access preamble. For example, the first wireless communication device may form a reception beam in the first beam direction for the monitoring in the first monitoring time period and may form a reception beam in the second beam direction for the monitoring in the second monitoring time period.

In an embodiment, the first wireless communication device may receive a message indicating the random access response monitoring configuration and a random access preamble transmission configuration. In such an embodiment, the first wireless communication device may transmit the one or more random access preambles based on the random access preamble transmission configuration. In an embodiment, the message is a handover command. The message may be received from a source BS (e.g., the BSs 105 and 300) serving the UE. The message may indicate a target BS for the handover. The random access preamble transmission configuration may indicate dedicated resources for the random access opportunities. The transmissions of the random access preambles and the monitoring of the random access responses are performed against the target BS.

Figure 10:
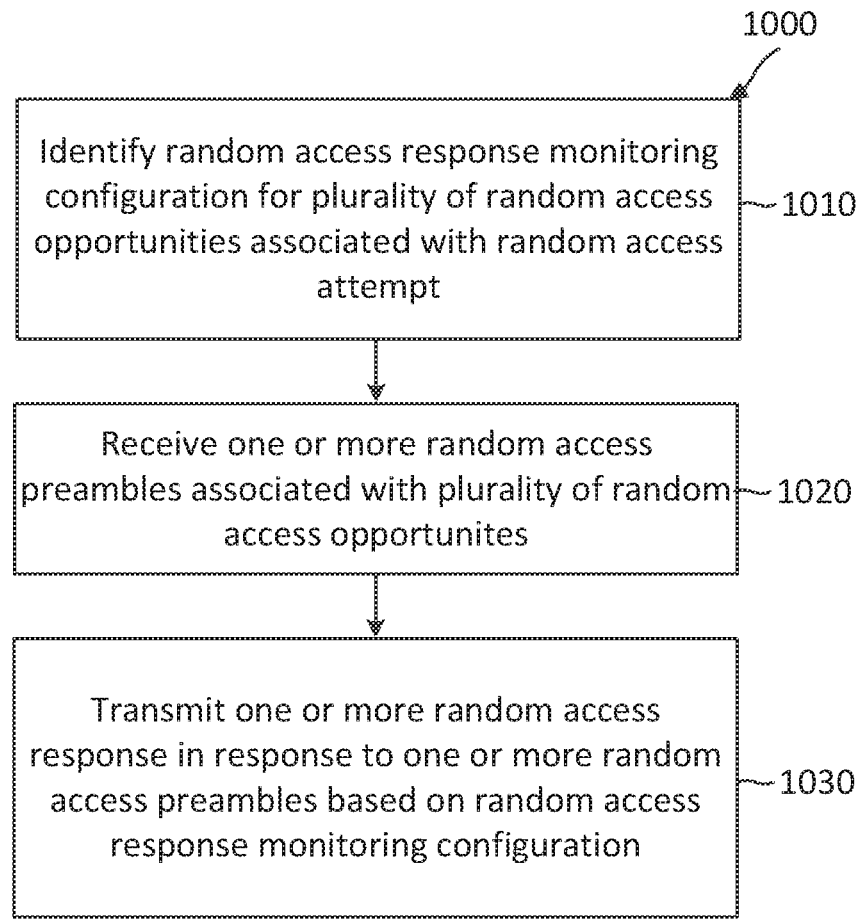
FIG. 10 is a flow diagram of a random access method according to embodiments of the present disclosure.

FIG. 10 is a flow diagram of a random access method 1000 according to embodiments of the present disclosure. Steps of the method 1000 can be executed by a computing device (e.g., a processor, processing circuit, and/or other suitable component) of a wireless communication device, such as the BSs 105 and 300. The method 1000 may employ similar mechanisms as in the method 400 and the schemes 500, 600, 700, and/or 800 described with respect to FIGS. 4, 5, 6, 7, and/or 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes identifying, by a first wireless communication device, a random access response monitoring configuration (e.g., the configurations 540 and 640) for a plurality of random access opportunities (e.g., the random access opportunities 502) associated with a random access attempt.

In an embodiment, the random access response monitoring configuration may include a sequence of time region or time periods (e.g., the portions 542, 544, 642, and 644) within a random access response window (e.g., the random access response window 522) for the plurality of random access opportunities. For example, the random access response monitoring configuration may indicate a first monitoring time period (e.g., the portion 542 or 642) for a first random access opportunity (e.g., the random access opportunity $502_{(1)}$) and a second monitoring time period (e.g., the portion 542 or 642) for a second random access opportunity (e.g., the random access opportunity $502_{(2)}$).

At step 1020, the method 1000 includes receiving, by the first wireless communication device from a second wireless communication device, one or more random access preambles (e.g., the random access preambles 512) associated with the plurality of random access opportunities.

For example, the first wireless communication device may receive a first random access preamble (e.g., the random access preambles $512_{(1)}$) in a first beam direction (e.g., the beam direction 516) over a first random access opportunity (e.g., the random access opportunity $502_{(1)}$) and may receive a second random access preamble (e.g., the random access preambles $512_{(2)}$) in a second beam direction (e.g., the beam direction 518) over a second random access opportunity (e.g., the random access opportunity $502_{(2)}$). The first and second beam directions are different.

At step 1030, the method 1000 includes transmitting, by the first wireless communication device to the second wireless communication device, one or more random access responses in response to the one or more random access preambles based on the random access response monitoring configuration For example, the first wireless communication device may transmit a random access response for the first random access preamble during the first monitoring time period in the first beam direction and may transmit a random access response for the second random access preamble during the second monitoring time period in the second beam direction.

In an embodiment of contention free random access (CFRA), a UE (e.g., the UEs 115 and 200) can be configured to transmit multiple preambles (e.g., the random access preambles 512) over dedicated multiple RACH transmission occasions (e.g., the random access opportunities 502) in time domain before the end of a monitored RAR window (e.g., the random access response window 522). However, with multiple preamble transmissions that span different beams (e.g., the beam directions 516 and 518), an issue arises when the UE starts to monitor random access response.

In a scenario, a UE may use different transmit beams across multiple RACH ocassions in time domain to transmit preambles. For example, a UE may transmit two preambles in different RACH occasions, where a preamble-1 is sent over beam-1 at time t1 and a preamble-2 is sent over beam-2 at time t2. As dedicated multiple RACH transmission occasions in time domain may use different beams at the gNB and/or the UE, issues such as which beam the gNB may use to transmit a random access response during the RAR window and which beam (beam-1 or beam 2) the UE may use for monitoring gNB response over the RAR window may arise.

One solution is to configure a UE monitoring bit pattern (e.g., the random access response monitoring configurations 540 and 640) over the RAR window for the case when multiple preamble transmissions has been signalled. When the UE monitoring bit pattern is provided, this field indicates the mapping from dedicated multiple RACH transmission occasions in time domain (CFRA-SSB-Resource/ra-Resources or CFRA-CSIRS-Resource/ra-Resources) to a sequence of time regions (e.g., the slots 504 and/or mini-slots) within the random access response window. With this indication, the UE can use the receive beam that corresponds to the transmission of RACH preamble over CFRA-SSB-Resource/ra-Resources and/or CFRA-CSIRS-Resource/ra-Resources during the indicated monitoring region within the random access response window. When the monitoring pattern is not provided, the UE may use a suitable beam to monitor random access response during the RAR window. However, it is up to the implementation of a UE to select a suitable beam.

In an embodiment of random access response reception, the MAC entity of a UE (e.g., the UEs 115 and 200) may begin random access response monitoring once the random access preamble (e.g., the random access preambles 512) is transmitted and regardless of the possible occurrence of a measurement gap.

In an embodiment example, when 'multiple preamble transmission' has been signaled, the UE may start the ra-ResponseWindow (e.g., the random access response window 522) at the start of the first PDCCH occasion after a fixed duration of X symbols from the end of the first preamble transmission. If ra-rarWindowMapping (e.g., the random access response monitoring configurations 540 and 640) is signaled, the UE may, for each preamble transmission, determine the monitoring occasions within the RAR window for the selected preamble to monitor the PDCCH of the special cell (SpCell) for random access response(s) identified by the RA-RNTI(s) while ra-ResponseWindow is running. Otherwise, the UE may select a suitable preamble transmission to monitor the PDCCH of the SpCell for random access response(s) identified by the RA-RNTI(s) while ra-ResponseWindow is running.

In an example, when the contention free random access preamble for a beam failure recovery request was transmitted by the MAC entity, the UE may start the bfr-ResponseWindow at the start of the first PDCCH occasion (e.g., the random access opportunities 502) after a fixed duration of X symbols from the end of the preamble transmission; and monitor the PDCCH of the SpCell for response to beam failure recovery request identified by the C-RNTI while bfr-ResponseWindow is running.

In an example, when the 'multiple preamble transmission' has not been signaled and the contention free random access preamble for a beam failure recovery request was not transmitted by the MAC entity, the UE may start the ra-ResponseWindow at the start of the first PDCCH occasion after a fixed duration of X symbols from the end of the preamble transmission; and monitor the PDCCH of the SpCell for random access response(s) identified by the RA-RNTI while the ra-ResponseWindow is running.

In an example, when a PDCCH transmission is addressed to the C-RNTI; and the contention free random access preamble for beam failure recovery request was transmitted by the MAC entity, the UE may consider the random access procedure successfully completed.

In an example, when a downlink assignment has been received on the PDCCH for the RA-RNTI and the received TB is successfully decoded, the UE may determine whether the random access response includes a Backoff Indicator subheader. If the random access response includes a Backoff Indicator subheader, the UE may set the PREAMBLE_BACKOFF to value of the BI field of the Backoff Indicator subheader. Otherwise, the UE may set the PREAMBLE_BACKOFF to 0 ms.

In an example, when a downlink assignment has been received on the PDCCH for the RA-RNTI and the received TB is successfully decoded, the UE may determine whether the random access response includes a random access preamble identifier corresponding to the transmitted PREAMBLE_INDEX. If the random access response includes a random access preamble identifier corresponding to the transmitted PREAMBLE_INDEX, the UE may consider this random access response reception is successful.

In an example, when a downlink assignment has been received on the PDCCH for the RA-RNTI and the received transport block (TB) is successfully decoded, the UE may determine whether the random access response reception is considered successful. If the random access response reception is considered successful, the UE may determine whether the random access response includes a random access preamble identifier (RAPID) only. If the random access response includes a RAPID only, the UE may consider this random access procedure as successfully completed; and indicate the reception of an acknowledgement for the SI request to upper layers. Otherwise, the UE may determine whether 'multiple preamble transmission' has been signaled. If 'multiple preamble transmission' has been signaled, the UE may stop transmitting remaining preambles, if any; apply the following actions for the serving cell where the Random Access Preamble was transmitted: process the received Timing Advance Command; indicate the ra-PreambleInitialReceivedTargetPower and the amount of power ramping applied to the latest preamble transmission to lower layers (i.e. (PREAMBLE_POWER_RAMPING_COUNTER−1)*powerRampingStep); process the received UL grant value and indicate it to the lower layers. The UE may also determine whether the random access preamble was not selected by the MAC entity among the common PRACH preambles. If the random access preamble was not selected by the MAC entity among the common PRACH preambles, the UE may consider the random access procedure successfully completed. Otherwise, the UE may set the TEMPORARY C-RNTI to the value received in the random access response. The UE may also determine whether this is the first successfully received random access response within this random access procedure and whether the transmission is not being made for the common control channel (CCCH) logical channel. If this is the first successfully received random access response within this random access procedure and the transmission is not being made for the CCCH logical channel, the UE may indicate to the multiplexing and assembly entity to include a C-RNTI MAC control element (CE) in the subsequent uplink transmission; and obtain the MAC packet data unit (PDU) to transmit from the multiplexing and assembly entity and store it in the Msg3 buffer.

In an example, when a ra-ResponseWindow expires and the random access response includes random access preamble identifiers that matches the transmitted PREAMBLE_INDEX has not been received; or when a bfr-ResponseWindow expires and the PDCCH addressed to the C-RNTI has not been received, the UE may consider the random access response reception as not successful; and increment the PREAMBLE_TRANSMISSION_COUNTER by 1. The UE may determine whether PREAMBLE TRANSMISSION COUNTER=ra-PreambleTx-Max+1. If PREAMBLE_TRANSMISSION_COUNTER=ra-PreambleTx-Max+1, the UE may determine whether the random access preamble is transmitted on a secondary cell (SCell). If the random access preamble is transmitted on the SCell, the UE may indicate a random access problem to upper layers. Otherwise, if the random access preamble is transmitted on a SCell, the UE may consider the random access procedure as unsuccessfully completed. If in this random access procedure, the random access preamble was selected by MAC among the common PRACH preambles, the UE may select a random backoff time according to a uniform distribution between 0 and the PREAMBLE_BACKOFF; delay the subsequent random access preamble transmission by the backoff time; and perform a random access resource selection procedure.

The MAC entity may stop ra-ResponseWindow (and hence monitoring for random access response(s)) after successful reception of a random access response including random access preamble identifiers that matches the transmitted PREAMBLE_INDEX.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a computer-readable medium having program code recorded thereon, the program code comprising code for causing a first wireless communication device to receive a random access response monitoring configuration for a plurality of random access opportunities associated with a random access attempt; code for causing the first wireless communication device to transmit, to a second wireless communication device, one or more random access preambles associated with the plurality of random access opportunities; and code for causing the first wireless communication device to monitor for a random access response for each of the one or more random access preambles based on the random access response monitoring configuration.

In some embodiments, wherein the code for causing the first wireless communication device to transmit the one or more random access preambles is further configured to transmit, in a first beam direction, a first random access preamble of the one or more random access preambles associated with a first random access opportunity of the plurality of random access opportunities; and transmit, in a second beam direction, a second random access preamble of the one or more random access preambles associated with a second random access opportunity of the plurality of random access opportunities, and wherein the first beam direction and the second beam direction are different. In some embodiments, wherein the code for causing the first wireless communication device to monitor for the random access response for each of the one or more random access is further configured to monitor for a random access response for the first random access preamble during a first monitoring time period indicated in the random access response monitoring configuration for the first random access opportunity; and monitor for a random access response for the second random access preamble during a second monitoring time period indicated in the random access response monitoring configuration for the second random access opportunity. In some embodiments, wherein the code for causing the first wireless communication device to receive the random access response monitoring configuration is further configured to receive a message indicating the random access response monitoring configuration and a random access preamble transmission configuration, and wherein the code for causing the first wireless communication device to transmit the one or more random access preambles is further configured to transmit the one or more random access preambles based on the random access preamble transmission configuration. In some embodiments, wherein the message is associated with a handover.

Further embodiments of the present disclosure include a computer-readable medium of wireless communication, comprising code for causing a first wireless communication device to identify a random access response monitoring configuration for a plurality of random access opportunities associated with a random access attempt; code for causing the first wireless communication device to receive, from a second wireless communication devices, one or more random access preambles associated with the plurality of random access opportunities; and code for causing the first wireless communication device to transmit, to the second wireless communication device, one or more random access responses in response to the one or more random access preambles based on the random access response monitoring configuration.

In some embodiments, wherein the code for causing the first wireless communication device to receive the one or more random access preambles is further configured to receive, from a first beam direction, a first random access preamble of the one or more random access preambles associated with a first random access opportunity of the plurality of random access opportunities; and receive, from a second beam direction, a second random access preamble of the one or more random access preambles associated with a second random access opportunity of the plurality of random access opportunities, wherein the first beam direction and the second beam direction are different. In some embodiments, wherein the code for causing the first wireless communication device to transmit the one or more random access responses is further configured to transmit, in the first beam direction, a random access response for the first random access preamble during a first monitoring time period indicated in the random access response monitoring configuration for the first random access opportunity; and transmit, in the second beam direction, a random access response for the second random access preamble during a second monitoring time period indicated in the random access response monitoring configuration for the second random access opportunity. In some embodiments, the computer-readable medium further comprises code for causing the first wireless communication device to monitor for a random access preamble associated with the plurality of random access opportunities based on a random access preamble transmission configuration. In some embodiments, the computer-readable medium further comprises code for causing the first wireless communication device to transmit a message including the random access preamble transmission configuration and the random access response monitoring configuration. In some embodiments, wherein the message is associated with a handover.

Further embodiments of the present disclosure include an apparatus comprising means for receiving a random access response monitoring configuration for a plurality of random access opportunities associated with a random access attempt; means for transmitting, to a second wireless communication device, one or more random access preambles associated with the plurality of random access opportunities; and means for monitoring for a random access response for each of the one or more random access preambles based on the random access response monitoring configuration.

In some embodiments, wherein the means for transmitting the one or more random access preambles is further configured to transmit, in a first beam direction, a first random access preamble of the one or more random access preambles associated with a first random access opportunity of the plurality of random access opportunities; and transmit, in a second beam direction, a second random access preamble of the one or more random access preambles associated with a second random access opportunity of the plurality of random access opportunities, and wherein the first beam direction and the second beam direction are different. In some embodiments, wherein the means for monitoring for the random access response for each of the one or more random access is further configured to monitor for a random access response for the first random access preamble during a first monitoring time period indicated in the random access response monitoring configuration for the first random access opportunity; and monitor for a random access response for the second random access preamble during a second monitoring time period indicated in the random access response monitoring configuration for the second random access opportunity. In some embodiments, wherein the means for receiving the random access response monitoring configuration is further configured to receive a message indicating the random access response monitoring configuration and a random access preamble transmission configuration, and wherein the means for transmitting the one or more random access preambles is further configured to transmit the one or more random access preambles based on the random access preamble transmission configuration. In some embodiments, wherein the message is associated with a handover.

Further embodiments of the present disclosure include an apparatus comprising means for identifying a random access response monitoring configuration for a plurality of random access opportunities associated with a random access attempt; means for receiving, from a second wireless communication devices, one or more random access preambles associated with the plurality of random access opportunities; and means for transmitting, to the second wireless communication device, one or more random access responses in response to the one or more random access preambles based on the random access response monitoring configuration.

In some embodiments, wherein the means for receiving the one or more random access preambles is further configured to receive, from a first beam direction, a first random access preamble of the one or more random access preambles associated with a first random access opportunity of the plurality of random access opportunities; and receive, from a second beam direction, a second random access preamble of the one or more random access preambles associated with a second random access opportunity of the plurality of random access opportunities, wherein the first beam direction and the second beam direction are different. In some embodiments, wherein the means for transmitting the one or more random access responses is further configured to transmit, in the first beam direction, a random access response for the first random access preamble during a first monitoring time period indicated in the random access response monitoring configuration for the first random access opportunity; and transmit, in the second beam direction, a random access response for the second random access preamble during a second monitoring time period indicated in the random access response monitoring configuration for the second random access opportunity. In some embodiments, the apparatus further comprises means for monitoring for a random access preamble associated with the plurality of random access opportunities based on a random access preamble transmission configuration. In some embodiments, the apparatus further comprises means for transmitting a message including the random access preamble transmission configuration and the random access response monitoring configuration. In some embodiments, wherein the message is associated with a handover.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device, a random access response monitoring configuration for a plurality of random access opportunities associated with a random access attempt, the random access response monitoring configuration including a mapping of the plurality of random access opportunities to a plurality of monitoring time periods, wherein the mapping of the plurality of random access opportunities to the plurality of monitoring time periods includes a bit pattern mapping;
transmitting, by the first wireless communication device to a second wireless communication device, one or more random access preambles associated with the plurality of random access opportunities; and
monitoring, by the first wireless communication device, for a random access response for each of the one or more random access preambles during one or more of the plurality of monitoring time periods based on the mapping of the plurality of random access opportunities to the plurality of monitoring time periods included in the random access response monitoring configuration.

2. The method of claim 1, wherein the transmitting includes:
transmitting, by the first wireless communication device in a first beam direction, a first random access preamble of the one or more random access preambles associated with a first random access opportunity of the plurality of random access opportunities; and
transmitting, by the first wireless communication device in a second beam direction, a second random access preamble of the one or more random access preambles associated with a second random access opportunity of the plurality of random access opportunities,
wherein the first beam direction and the second beam direction are different.

3. The method of claim 2, wherein the monitoring includes:
monitoring, by the first wireless communication device, for a random access response for the first random access preamble during a first monitoring time period indicated in the random access response monitoring configuration for the first random access opportunity; and
monitoring, by the first wireless communication device, for a random access response for the second random access preamble during a second monitoring time period indicated in the random access response monitoring configuration for the second random access opportunity.

4. The method of claim 3, wherein the plurality of monitoring time periods includes the first monitoring time period and the second monitoring time period.

5. The method of claim 1, wherein the receiving includes receiving a message indicating the random access response monitoring configuration and a random access preamble transmission configuration, and wherein the transmitting includes transmitting the one or more random access preambles based on the random access preamble transmission configuration.

6. The method of claim 5, wherein the message is associated with a handover.

7. A method of wireless communication, comprising:
identifying, by a first wireless communication device, a random access response monitoring configuration for a plurality of random access opportunities associated with a random access attempt, the random access response monitoring configuration including a mapping of the plurality of random access opportunities to a plurality of monitoring time periods, wherein the mapping of the plurality of random access opportunities to the plurality of monitoring time periods includes a bit pattern mapping;
receiving, by the first wireless communication device from a second wireless communication device, one or more random access preambles associated with the plurality of random access opportunities; and
transmitting, by the first wireless communication device to the second wireless communication device, one or more random access responses during one or more of the plurality of monitoring time periods in response to the one or more random access preambles based on the mapping of the plurality of random access opportunities to the plurality of monitoring time periods included in the random access response monitoring configuration.

8. The method of claim 7, wherein the receiving includes:
receiving, by the first wireless communication device from a first beam direction, a first random access preamble of the one or more random access preambles associated with a first random access opportunity of the plurality of random access opportunities; and
receiving, by the first wireless communication device from a second beam direction, a second random access preamble of the one or more random access preambles associated with a second random access opportunity of the plurality of random access opportunities,
wherein the first beam direction and the second beam direction are different.

9. The method of claim 8, wherein the transmitting includes:
transmitting, by the first wireless communication device in the first beam direction, a random access response for the first random access preamble during a first monitoring time period indicated in the random access response monitoring configuration for the first random access opportunity; and
transmitting, by the first wireless communication device in the second beam direction, a random access response for the second random access preamble during a second monitoring time period indicated in the random access response monitoring configuration for the second random access opportunity.

10. The method of claim 9, wherein the plurality of monitoring time periods includes the first monitoring time period and the second monitoring time period.

11. The method of claim 7, further comprising:
monitoring, by the first wireless communication device, for a random access preamble associated with the plurality of random access opportunities based on a random access preamble transmission configuration.

12. The method of claim 11, further comprising:
transmitting, by the first wireless communication device, a message including the random access preamble transmission configuration and the random access response monitoring configuration.

13. The method of claim 12, wherein the message is associated with a handover.

14. An apparatus comprising:
a transceiver configured to:
receive a random access response monitoring configuration for a plurality of random access opportunities associated with a random access attempt, the random access response monitoring configuration including a mapping of the plurality of random access opportunities to a plurality of monitoring time periods, wherein the mapping of the plurality of random access opportunities to the plurality of monitoring time periods includes a bit pattern mapping; and transmit, to a wireless communication device, one or more random access preambles associated with the plurality of random access opportunities; and a processor configured to monitor for a random access response for each of the one or more random access preambles during one or more of the plurality of monitoring time periods based on the mapping of the plurality of random access opportunities to the plurality of monitoring time periods included in the random access response monitoring configuration.

15. The apparatus of claim 14, wherein the transceiver is further configured to transmit the one or more random access preambles by:

transmitting, in a first beam direction, a first random access preamble of the one or more random access preambles associated with a first random access opportunity of the plurality of random access opportunities; and transmitting, in a second beam direction, a second random access preamble of the one or more random access preambles associated with a second random access opportunity of the plurality of random access opportunities, wherein the first beam direction and the second beam direction are different.

16. The apparatus of claim 15, wherein the processor is further configured to monitor for the random access response for each of the one or more random access preambles by:

monitoring for a random access response for the first random access preamble during a first monitoring time period indicated in the random access response monitoring configuration for the first random access opportunity; and monitoring for a random access response for the second random access preamble during a second monitoring time period indicated in the random access response monitoring configuration for the second random access opportunity.

17. The apparatus of claim 16, wherein the plurality of monitoring time periods includes the first monitoring time period and the second monitoring time period.

18. The apparatus of claim 14, wherein the transceiver is further configured to:

receive the random access response monitoring configuration by receiving a message indicating the random access response monitoring configuration and a random access preamble transmission configuration; and transmit the one or more random access preambles based on the random access preamble transmission configuration.

19. The apparatus of claim 18, wherein the message is associated with a handover.

20. An apparatus comprising:

a processor configured to identify a random access response monitoring configuration for a plurality of random access opportunities associated with a random access attempt, the random access response monitoring configuration including a mapping of the plurality of random access opportunities to a plurality of monitoring time periods, wherein the mapping of the plurality of random access opportunities to the plurality of monitoring time periods includes a bit pattern mapping; and a transceiver configured to:

receive, from a wireless communication device, one or more random access preambles associated with the plurality of random access opportunities; and transmit, to the wireless communication device, one or more random access responses during one or more of the plurality of monitoring time periods in response to the one or more random access preambles based on the mapping of the plurality of random access opportunities to the plurality of monitoring time periods included in the random access response monitoring configuration.

21. The apparatus of claim 20, wherein the transceiver is further configured to receive the one or more random access preambles by:

receiving, from a first beam direction, a first random access preamble of the one or more random access preambles associated with a first random access opportunity of the plurality of random access opportunities; and receiving, from a second beam direction, a second random access preamble of the one or more random access preambles associated with a second random access opportunity of the plurality of random access opportunities, wherein the first beam direction and the second beam direction are different.

22. The apparatus of claim 21, wherein the transceiver is further configured to transmit the one or more random access responses by:

transmitting, in the first beam direction, a random access response for the first random access preamble during a first monitoring time period indicated in the random access response monitoring configuration for the first random access opportunity; and transmitting, in the second beam direction, a random access response for the second random access preamble during a second monitoring time period indicated in the random access response monitoring configuration for the second random access opportunity.

23. The apparatus of claim 22, wherein the plurality of monitoring time periods includes the first monitoring time period and the second monitoring time period.

24. The apparatus of claim 20, wherein the processor is further configured to:

monitor for a random access preamble associated with the plurality of random access opportunities based on a random access preamble transmission configuration.

25. The apparatus of claim 24, wherein the transceiver is further configured to:

transmit a message including the random access preamble transmission configuration and the random access response monitoring configuration.

26. The apparatus of claim 25, wherein the message is associated with a handover.

27. The method of claim 1, wherein the mapping of the plurality of random access opportunities to the plurality of monitoring time periods includes a mapping of the plurality of random access opportunities to one or more slots of a random access response window.

28. The method of claim 27, wherein the mapping of the plurality of random access opportunities to the one or more slots of the random access response window includes:

mapping a first random access opportunity of the plurality of random access opportunities to a first set of slots of the random access response window; and mapping a second random access opportunity of the plurality of random access opportunities to a second set of slots of the random access response window.

29. The method of claim 28, wherein at least one slot from the second set of slots is positioned between a pair of slots from the first set of slots.

30. The method of claim 28, wherein the slots of the first set of slots and the slots of the second set of slots form an alternating pattern.

31. The method of claim 7, wherein the mapping of the plurality of random access opportunities to the plurality of monitoring time periods includes a mapping of the plurality of random access opportunities to one or more slots of a random access response window.

32. The apparatus of claim 14, wherein the mapping of the plurality of random access opportunities to the plurality of monitoring time periods includes a mapping of the plurality of random access opportunities to one or more slots of a random access response window.

33. The apparatus of claim 20, wherein the mapping of the plurality of random access opportunities to the plurality of monitoring time periods includes a mapping of the plurality of random access opportunities to one or more slots of a random access response window.

* * * * *